United States Patent
Miller et al.

(10) Patent No.: US 11,603,026 B2
(45) Date of Patent: Mar. 14, 2023

(54) ILLUMINATING BOW ROLLER ASSEMBLY

(71) Applicant: Boatmate Trailers, LLC, Maryville, TN (US)

(72) Inventors: Ronnie C. Miller, Knoxville, TN (US); William Charles Miller, Knoxville, TN (US)

(73) Assignee: BOATMATE TRAILERS, LLC, Maryville, TN (US)

( * ) Notice: Subject to any disclaimer, the term of this patent is extended or adjusted under 35 U.S.C. 154(b) by 0 days.

(21) Appl. No.: 17/510,940

(22) Filed: Oct. 26, 2021

(65) Prior Publication Data
US 2022/0134935 A1 May 5, 2022

Related U.S. Application Data

(60) Provisional application No. 63/109,493, filed on Nov. 4, 2020.

(51) Int. Cl.
*B60P 3/10* (2006.01)
*F21V 23/00* (2015.01)
(Continued)

(52) U.S. Cl.
CPC .............. *B60P 3/1066* (2013.01); *B60Q 1/24* (2013.01); *F21V 23/001* (2013.01); *F21V 23/04* (2013.01);
(Continued)

(58) Field of Classification Search
CPC ........ B60P 3/1066; B60P 3/1075; B60Q 1/24; B60Q 1/305; F21V 23/001; F21V 23/04;
(Continued)

(56) References Cited

U.S. PATENT DOCUMENTS 4,811,171 A * 3/1989 Viola .................... F21S 43/247
340/815.42
5,064,336 A * 11/1991 Godbersen ............ B60P 3/1066
254/326
(Continued)

OTHER PUBLICATIONS

BluewaterLED Trailer LED Lighting Kit—Submersible, T-H Marine Supplies, https://thmarinesupplies.com/products/bluewater-led-trailer-led-lightingkit-submersible, 3 pages (Date Downloaded Apr. 2, 2020).
(Continued)

*Primary Examiner* — Peggy A Neils
(74) *Attorney, Agent, or Firm* — Merchant & Gould P.C.

(57) ABSTRACT

An illuminating bow roller assembly to facilitate loading a watercraft onto a trailer under dark conditions is disclosed. Example components of the assembly include a pair of end bells, a roller, and a yoke into one or more of which lighting elements are recessed into, and a fastening assembly to connect the components to form the assembly. Generally, the lighting elements are arranged such that light therefrom is emitted toward one or more of the end bells and roller. The end bells and roller are composed of a translucent material that propagates light emitted from the lighting elements, which extends illumination to areas surrounding the bow roller assembly in addition to the bow roller assembly itself. A water-activated switch can be implemented to control the illumination of the assembly such that the lighting elements only emit light when the trailer is contacting water.

20 Claims, 11 Drawing Sheets

(51) Int. Cl.
  *B60Q 1/24* (2006.01)
  *F21V 23/04* (2006.01)
  *F21Y 105/18* (2016.01)
  *F21Y 115/10* (2016.01)

(52) U.S. Cl.
  CPC ....... *F21Y 2105/18* (2016.08); *F21Y 2115/10* (2016.08)

(58) Field of Classification Search
  CPC .............. F21V 33/008; F21W 2107/20; F21Y 2105/18; F21Y 2115/10
  See application file for complete search history.

(56) References Cited

U.S. PATENT DOCUMENTS

| | | | |
|---|---|---|---|
| 5,299,903 A * | 4/1994 | Kesselring | B60P 3/1075 414/529 |
| 5,949,329 A | 9/1999 | Woodard | |
| 7,017,933 B2 | 3/2006 | Mickley | |
| 9,976,710 B2 | 5/2018 | Meir | |
| 2003/0189836 A1* | 10/2003 | Sparling | B60Q 1/305 362/540 |
| 2009/0066058 A1 | 3/2009 | Comried, Jr. | |
| 2015/0061899 A1 | 3/2015 | Wiegand et al. | |
| 2016/0264220 A1 | 9/2016 | Laceky et al. | |

OTHER PUBLICATIONS

CE Smith Post-Style Guide-Ons with LED Lights for Boat Trailers13 60" Tall—1 Pair, https://www.etrailer.com/Boat-Trailer-Parts/CE-Smith/CE27760.html, 19 pages (Date Downloaded Apr. 2, 2020).

Polyurethane Rollers for Boat Trailers, Stoltz Super Rollers, Stoltz Industries, Inc., 2 pages (Date Downloaded Apr. 2, 2020).

* cited by examiner

ILLUMINATING BOW ROLLER ASSEMBLY

CROSS-REFERENCE TO RELATED APPLICATIONS

This application claims the benefit of U.S. Provisional Application No. 63/109,493, filed Nov. 4, 2020, which is hereby incorporated by reference in its entirety herein.

BACKGROUND

Proper loading of a watercraft, such as a boat, onto a trailer to prevent damage to the boat or trailer can be a difficult task. Loading under conditions that impair the boat driver's vision, such as nighttime loading, makes it even more difficult for the driver to align the boat with the trailer for loading. Lighting elements mounted to or recessed within the frame of the trailer are commonly used to provide illumination to aid in the alignment and loading process. However, conventional lighting elements are often positioned distant from the location on the trailer where the trailer engages the bow region of the boat for loading. Additionally, for lighting elements positioned within or under the frame of the trailer, the boat blocks the illumination when the boat is aligned with and being loaded onto the trailer. Therefore, improved methods of illumination are desired.

It is with respect to these and other general considerations that embodiments have been described.

SUMMARY

In accordance with the present disclosure, the above and other issues are addressed by the following:

In one example aspect, a bow roller assembly is described. An example bow roller assembly includes bow roller components comprising: a first end bell; a second end bell; a roller comprising a first end portion and a second end portion; a yoke comprising a frame having at least a first side and a second side, wherein when the bow roller components are connected together, the first side is arranged between the first end bell and the first end portion of the roller, and the second side is arranged between the second end portion of the roller and the second end bell; a fastening assembly configured to connect the bow roller components together; and one or more lighting elements recessed into one or more of the bow roller components to illuminate the bow roller assembly, wherein when the bow roller assembly is assembled, the one or more lighting elements are arranged such that light from the one or more lighting elements illuminates one or more of the first end bell, the second end bell, and the roller.

In another example aspect, a device for illuminating a bow roller assembly is described. An example device includes: a yoke of the bow roller assembly; and one or more lighting elements recessed into the yoke to illuminate the bow roller assembly, wherein the recessed lighting elements are arranged in the yoke such that, when the yoke is connected with a first end bell, a roller, and a second end bell by a fastening assembly to form the bow roller assembly, light from the recessed lighting elements is emitted towards one or more of the first end bell, the roller, and the second end bell.

In a further example aspect, another device for illuminating a bow roller assembly is described. The other example device includes: a roller of the bow roller assembly, the roller comprised of a translucent material; and one or more lighting elements recessed into the roller to illuminate the bow roller assembly, wherein the recessed lighting elements are arranged in the roller such that, when the roller is connected with a first end bell, a yoke, and a second end bell by a fastening assembly to form the bow roller assembly, light emitted from the recessed lighting elements to illuminate the bow roller assembly is further propagated to an area surrounding the bow roller assembly based on the translucent material.

In a yet further example aspect, a further device for illuminating a bow roller assembly is described. The further example device includes: an end bell of the bow roller assembly, the end bell comprised of a translucent material; and a lighting element recessed into the end bell to illuminate the bow roller assembly, wherein the recessed lighting element is arranged in the end bell such that, when the end bell is connected with a yoke, a roller, and another end bell by a fastening assembly to form the bow roller assembly, light emitted from the recessed lighting element to illuminate the bow roller assembly is further propagated to an area surrounding the bow roller assembly based on the translucent material.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

Non-limiting and non-exhaustive examples are described with reference to the following figures.

DETAILED DESCRIPTION

Figure 1:
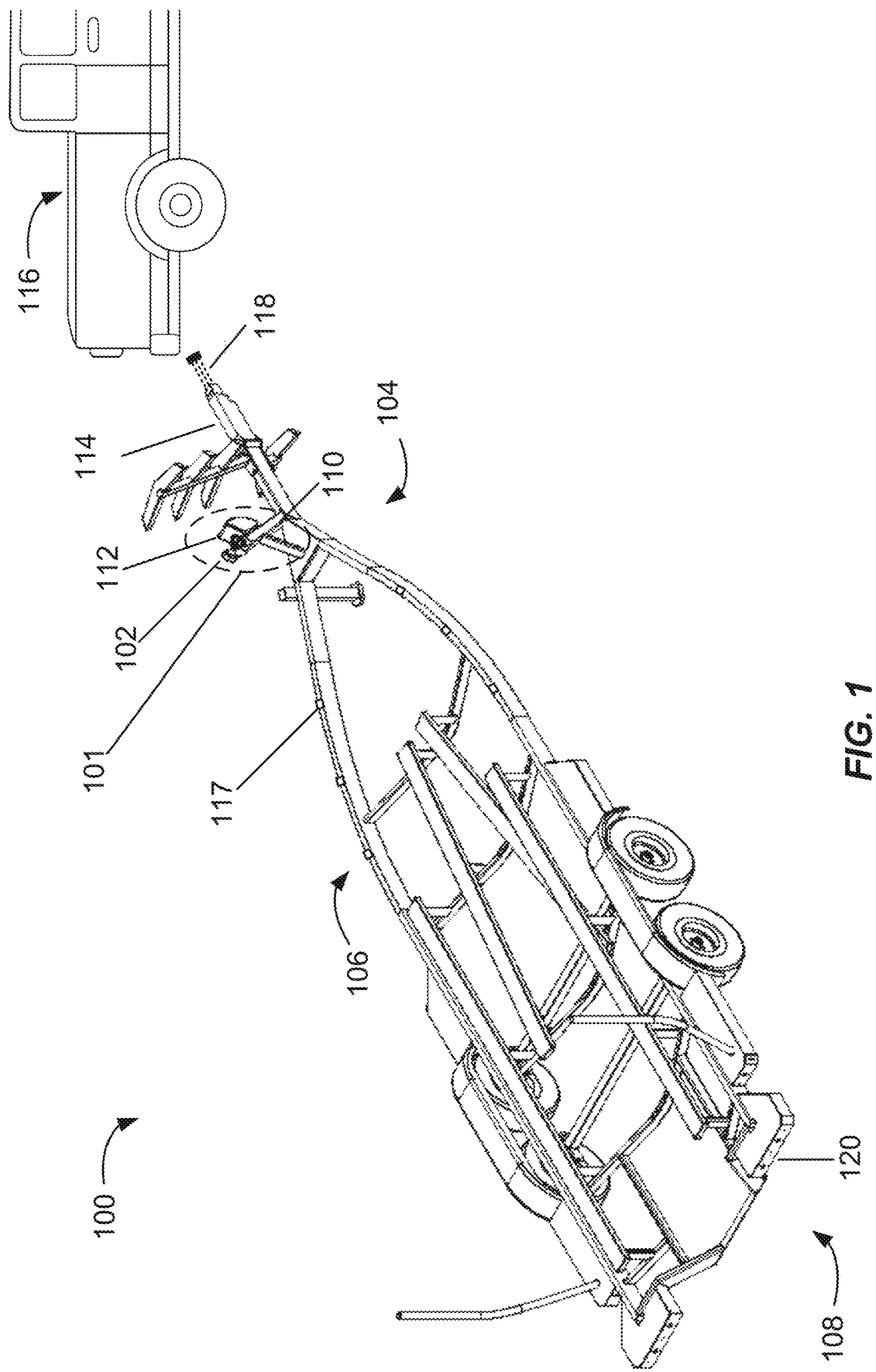
FIG. 1 illustrates an example trailer having an example bow stop with a bow roller assembly mounted thereon that provides illumination.

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

As briefly described above, loading a watercraft onto a trailer under conditions that impair the watercraft driver's vision, such as nighttime loading, makes it more difficult for the driver to align the watercraft with the trailer. As one example, when loading a boat onto a trailer under dark conditions, typically the boat's driver will drive the boat up onto the trailer using illuminated runway lights of the trailer as a guide. The runway lights may be mounted to or recessed in a frame of the trailer, such that when illuminated, the boat's driver can see an outer edge of the trailer itself. The boat's driver will also use a bow roller assembly or other similar bow assembly positioned at a forward end of the trailer to center the boat. Specifically, the boat driver needs to engage a bow of the boat with a roller component of the bow roller assembly. Under the dark conditions, it may be difficult for the boat driver to see the bow roller assembly making this alignment challenging. For example, as the boat drives onto the trailer towards the bow roller assembly, the illumination provided by the runway lights is dampened as the boat at least partially blocks the illumination. Thus, the boat driver may be limited to relying on lights from the boat, lights in the loading area, and/or flashlights held or worn by the driver and/or others assisting the driver to more easily see the bow roller assembly.

To overcome the limitations of these common lighting options, a bow roller assembly disclosed herein comprises one or more lighting elements mounted or recessed into one or more components of the bow roller assembly. The one or more components include a first end bell, a second end bell, a roller, and a yoke that are connected by a fastening assembly to form the bow roller assembly. Emission of light from the lighting elements illuminates the bow roller assembly, which enables the boat driver to easily see the bow roller assembly in order to center the boat with the roller component. Additionally, the lighting elements are arranged within the bow roller assembly such that light from the lighting elements illuminates one or more of the roller and end bell components. The roller and end bell components are composed of a material having translucent properties that facilitate propagation of the light to areas surrounding the bow roller assembly. Additionally, in some examples, a shape of the roller and end bell components can further facilitate the propagation of the light. Therefore, in addition to the bow roller assembly itself being illuminated, the bow roller assembly also illuminates and provide improved visualization of areas surrounding the bow roller assembly, which can be helpful for additional tasks performed to secure the boat in those surrounding areas. For example, once the bow of the boat is centered and engaged with the roller component of the bow roller assembly, often another person assisting the boat driver is positioned at the front of trailer to hook a winch strap located adjacent to the bow roller assembly to a bow eye of the boat. The person will then winch the bow of the boat tight against the roller using a manual or electric reeling mechanism. The illumination provided allows the person to more efficiently perform these tasks as they can better visualize each component without having to give up a working hand to hold a separate external light source, such as a flashlight.

Moreover, in some examples, the illumination of the bow roller assembly disclosed herein may be controlled by an external contact switch such that the lighting elements of the bow roller assembly only emit light when the trailer is in contact with water (e.g., for loading of the boat). Once the trailer is removed from the water, the lighting elements will cease emitting light, ensuring compliance with roadway regulations that prohibit certain types and colors of lights from being illuminated as the tow vehicle hauls the trailered boat.

While boats and boat trailers will be described in the examples herein, these examples are non-exhaustive and non-limiting. Other types of watercraft and trailers for those respective watercraft types that utilize a bow roller assembly can similarly implement the illuminating bow roller assembly disclosed herein to facilitate loading under dark conditions.

FIG. 1 illustrates an example trailer 100 having a bow stop 101 with a bow roller assembly 102 mounted thereon that provides illumination. The trailer 100 is generally comprised of a forward portion 104, a frame 106, and a rearward portion 108. The forward portion 104 of the trailer 100 includes, among other components, the bow stop 101 comprising a support structure 110 to which a bow assembly, such as the bow roller assembly 102, and a winch assembly 112 are mounted, and a tongue 114 that facilitates the connection of the trailer 100 to a tow vehicle 116. The frame 106 supports a boat or other watercraft of a particular type and weight, and can include runway lights 117 mounted to or recessed in the frame 106, such that when illuminated, the outer edge of the frame 106 is visible to facilitate loading of the boat under dark conditions. The rearward portion 108 of the trailer 100 includes, among other components, a switch 120 to control an illumination of the bow roller assembly 102. In other embodiments the switch 120 can be arranged at another location on or in the trailer 100.

The bow assembly, such as the bow roller assembly 102, receives a bow of a boat being loaded onto the trailer 100. The bow roller assembly 102, as illustrated and described in greater detail with reference to FIGS. 2-6, is one example type of bow assembly comprised of bow roller components, including a first end bell, a second end bell, a roller, and a yoke, and a fastening assembly that connects the bow roller components to form the bow roller assembly 102. In some example configurations, the roller and the end bells rotate within the bow roller assembly 102 to prevent damage to the bow of the boat when received at the roller. Additionally, the bow roller assembly 102 includes lighting elements that can be mounted or recessed into one or more of the bow roller components. The lighting elements emit light to illuminate the bow roller assembly 102. This illumination, among other things, aids a driver of the boat with visualization of the roller to which the driver needs to center the bow of the boat with for loading.

In some examples, the lighting elements can be arranged within the bow roller assembly 102 to direct light emitted from the lighting elements towards or otherwise illuminate particular bow roller components of the bow roller assembly 102, such as the end bells and/or roller, that are composed of materials having at least translucent properties to facilitate propagation of the light (e.g., via refraction) to surrounding areas of the bow roller assembly 102. In some examples, a shape of the end bells and/or roller can further facilitate the propagation of the light. This improves visualization in the surrounding areas, which is helpful for performing additional processes to secure the boat to the trailer 100 for transport such as the winching process performed utilizing the winch assembly 112. The winch assembly 112 is positioned adjacent to the bow roller assembly 102 on the support structure 110. The winch assembly 112 includes a winch strap that hooks to a bow eye mounted on the bow of the boat. The winch assembly 112 also includes one or more of a manual or an electric mechanism that reels in the winch strap hooked to the bow eye to winch the bow of the boat tight against the roller of the bow roller assembly 102 when the boat is loaded onto the trailer 100. Therefore, the extended illumination provided by the bow roller assembly 102 allows a person to more efficiently utilize the winch assembly 112 to perform these tasks as they can better visualize each component without having to give up a working hand to hold a separate external light source, such as a flashlight.

Wiring connected to the lighting elements, referred to herein as lighting element wires, can be enclosed in a conduit or otherwise protected (e.g., by other components of the bow roller assembly 102 such as the yoke). The lighting element wires extend from the bow roller assembly 102 into bow tubing within a hollow interior of the support structure 110, where the lighting element wires then exit the bow tubing and join into a wiring harness 118. The wiring harness is an assembly of wires capable of carrying current. In some examples, the wiring harness 118 can be fed through the tongue 114 in the forward portion 104 of the trailer 100 and run throughout a hollow interior of the frame 106 to the rearward portion 108 of the trailer 100. The assembly of wires comprising the wiring harness 118 provide current from a power source, such as an electrical system of the tow vehicle 116, to a variety of electrical components of the trailer 100 including the lighting elements of the bow roller assembly 102. For example, current can be provided when running lights of the tow vehicle 116 are turned on and powered by a battery component of the electrical system.

As illustrated, the switch 120 to control the illumination of the bow roller assembly 102 is positioned underneath a right-side, rear step of the trailer 100, where the right-side corresponds to a passenger side of the tow vehicle 116. However, the switch 120 is not limited to this position, and in other embodiments the switch 120 can be arranged at other locations on or in the trailer 100. The switch 120 is connected to the electrical system of the tow vehicle 116 (e.g., the power source) and the lighting elements of the bow roller assembly 102 via the lighting element wires within the wiring harness 118 to form a circuit. A variety of different types of automatic or manual switches 120 can be incorporated into the trailer 100 to control the illumination of the bow roller assembly 102.

As one non-limiting example, the switch 120 is an external contact switch that is actuated by submersion in water. The switch 120 is comprised of two contact points that when contacted with water, for example, receive continuity through the water causing the circuit to complete. Completion of the circuit when the running lights of the tow vehicle 116 are turned on allows a current (e.g., a flow of electrons) through the lighting element wires within the wiring harness 118 from the electrical system of the tow vehicle 116 to the lighting elements of the bow roller assembly 102. Receipt of the current causes the lighting elements to emit light and resultantly illuminate the bow roller assembly 102. Therefore, when the running lights of the tow vehicle 116 are on and the trailer 100 is backed into water by the tow vehicle 116 to load a boat, the switch 120 completes the circuit, the lighting element wires within the wiring harness 118 carry current to the lighting elements, and the lighting elements emit light to illuminate the bow roller assembly 102.

Once the boat is loaded and secured on the trailer 100, the tow vehicle 116 removes the trailer 100 from the water, which causes the two contact points of the switch 120 to no longer be in contact with the water and lose continuity. As a result, the switch 120 breaks the circuit. Breaking of the circuit prevents the current from reaching the lighting elements of the bow roller assembly 102, and thus the lighting elements cease light emission and the bow roller assembly 102 is no longer illuminated. Implementing the external contact switch 120, or an alternative switch type with similar features, that automatically cause illumination of the bow roller assembly 102 to cease upon the removal of the trailer 100 from the water enables compliance with roadway regulations that prohibit certain types and colors of lights from being illuminated as the tow vehicle 116 transports the trailered boat on roadways.

In some examples, the switch 120 used to control the illumination of the bow roller assembly 102 can be a same switch used to control illumination of the runway lights 117 mounted to or recessed in the frame 106 of the trailer 100. Similar to the bow roller assembly 102, illumination of the runway lights 117 upon entry of the trailer 100 into the water helps facilitate guiding of the boat onto the trailer 100 for loading, while ceasing of the illumination upon removal of the trailer 100 from the water enables compliance with roadway regulations. However, the switch 120 is distinct from one or more other switches used to control other electrical components of the trailer 100 that need to be operative during transport of the trailer 100 on the roadways by the tow vehicle 116 to comply with roadway regulations, such as taillights, stoplights, turn lights, side marker lights, rear marker lights, and clearance lights, among other similar lights.

In another possible embodiment, the switch 120 can be activated and deactivated by a remote control.

Figure 2:
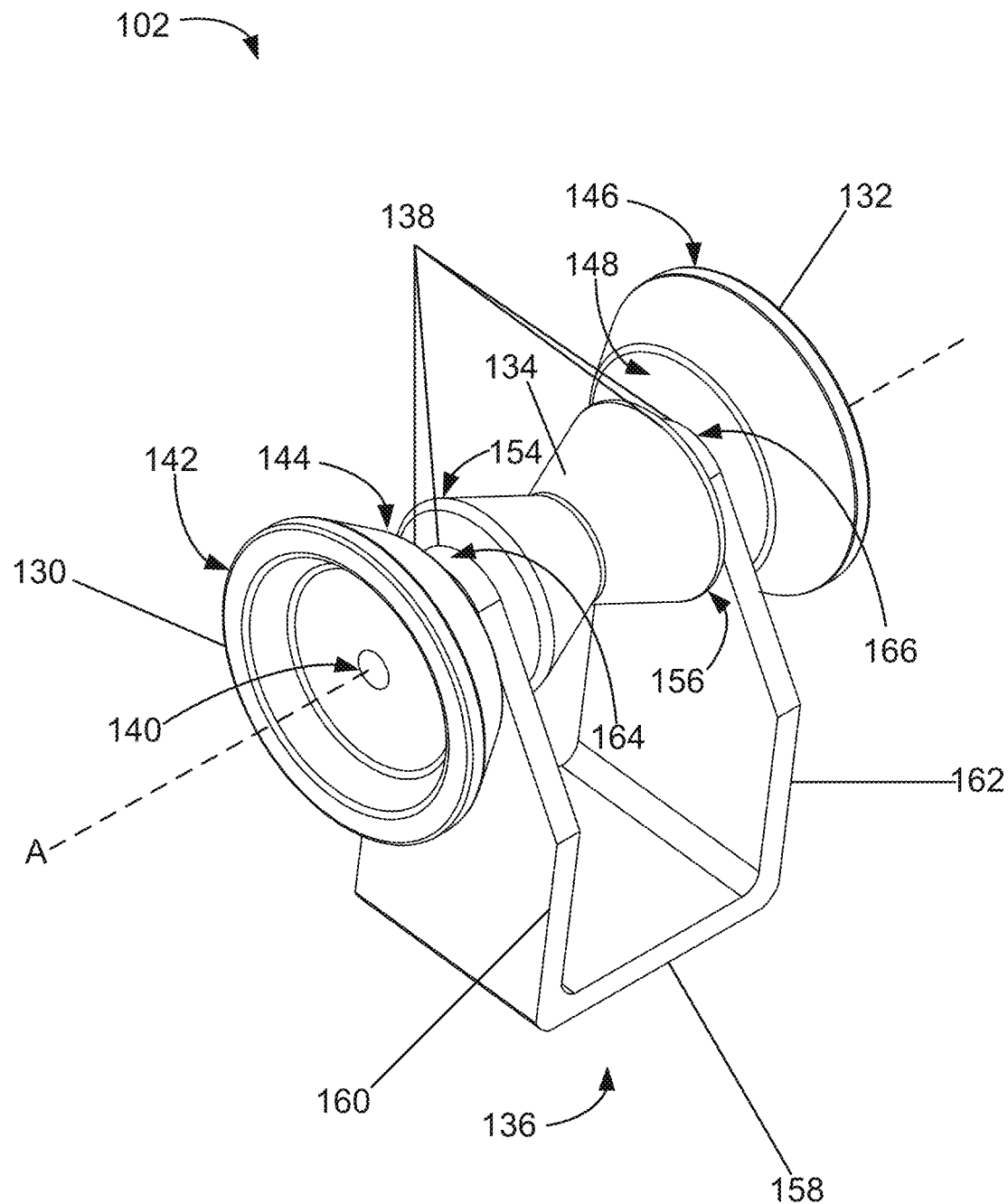
FIG. 2 illustrates a front, left side perspective view of an example configuration of a bow roller assembly according to the principles of the present disclosure.
Figure 3:
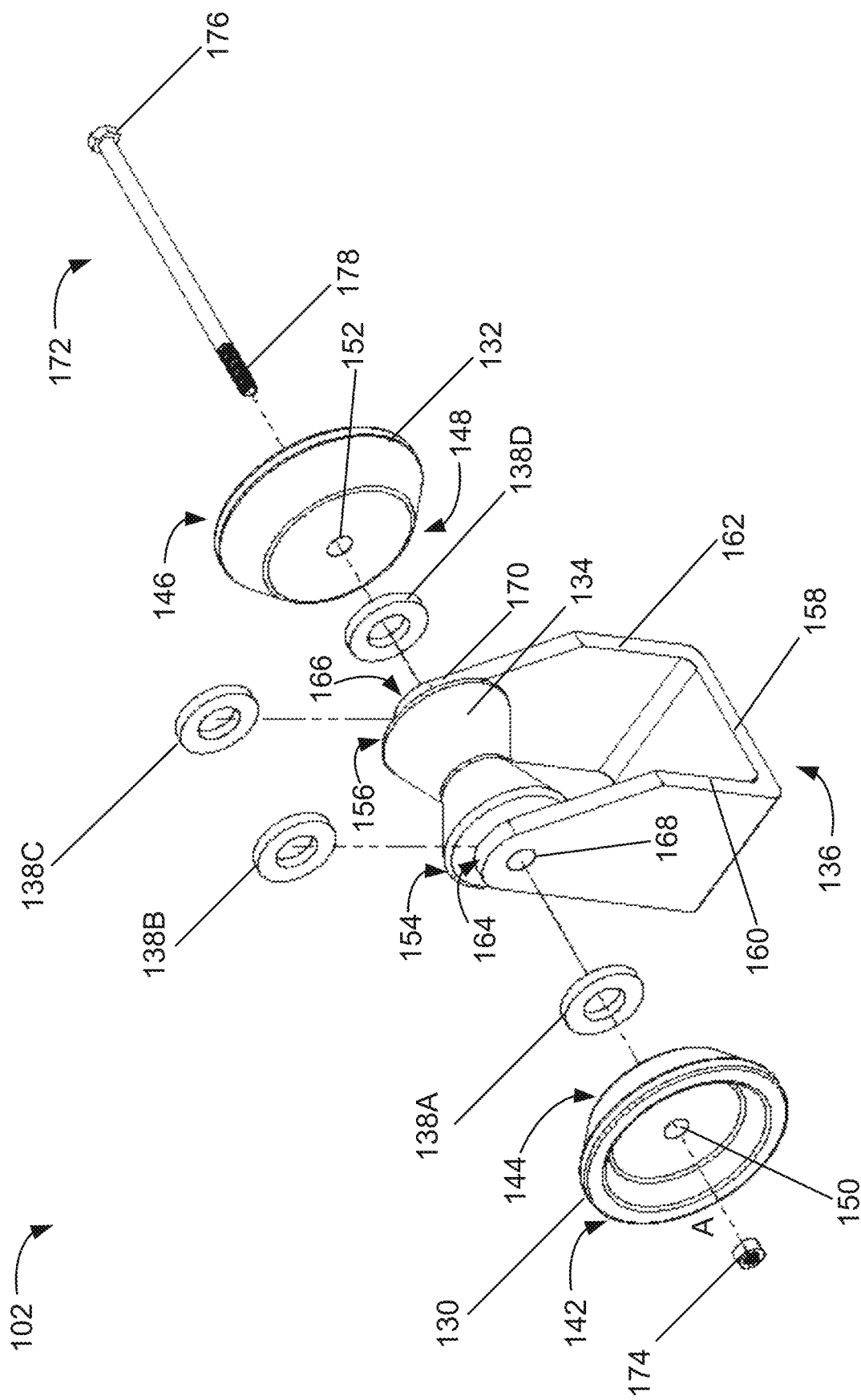
FIG. 3 illustrates an exploded view of the example bow roller assembly of FIG. 2.

FIGS. 2-6 illustrate an example configuration of the bow roller assembly 102 according to the principles of the present disclosure. FIG. 2 illustrates a front, left side perspective view of the bow roller assembly 102. FIG. 3 illustrates an exploded view of the bow roller assembly 102 of FIG. 2.

The example bow roller assembly 102 includes a first end bell 130, a second end bell 132, a roller 134, a yoke 136, lighting elements 138A, 138B, 138C, 138D (e.g., collectively referred to as lighting elements 138), and a fastening assembly 140.

The first end bell 130 and the second end bell 132 can be configured in a variety of different shapes. The shape can be based on a shape of the bow of the boat or other watercraft that the bow assembly 102 is receiving as the boat is being aligned and loaded onto a trailer such as trailer 100. In some examples and as illustrated, each of the first end bell 130 and the second end bell 132 is a hollow truncated cone having an open first end portion 142, 146 and a closed second end portion 144, 148. Additionally, the hollow truncated cone can be a frustum having identical edges, and thus is a uniform prism. Each of the first end bell 130 and the second end bell 132 can include an aperture 150, 152 located centrally on the closed second end portion 144, 148 to enable insertion of portions of the fastening assembly 140 therethrough when assembling the bow roller assembly 102. A diameter of the apertures 150, 152 is based on a type of the fastening assembly 140 implemented.

The roller 134 has a closed first end portion 154, a closed second end portion 156, and a hollow, cylindrical core along a longitudinal axis A extending between the first end portion 154 and the second end portion 156. Each of the first end portion 154 and the second end portion 156 have apertures corresponding to a diameter of the hollow, cylindrical core to enable insertion of portions of the fastening assembly 140 through the core when assembling the bow roller assembly 102. The diameter of the core and apertures is based on a type of the fastening assembly 140 implemented. An exterior of the roller 134 can be formed in a variety of different shapes and configurations. Similar to the end bells 130, 132, the shape can be based on a shape of the bow of the boat or other watercraft that the bow assembly 102 is receiving as the boat is being aligned and loaded onto a trailer such as trailer 100. In some examples and as illustrated, the exterior of the roller 134 is v-shaped, where the end portions 154, 156 of the roller 134 are wider and gradually become narrower to create a narrowest portion of the roller 134 in the middle of the roller 134. In some aspects, the v-shaped roller 134 can form two frustrums (e.g., one from the first end portion 154 to the middle, and one from the middle to the second end portion 156) having identical edges, and thus acting as a uniform prism. As another example, the exterior of the roller 134 can be spool-shaped. As a further example, the exterior of the roller 134 can be cylindrical, having a same width across the roller 134.

The first end bell 130, the second end bell 132, and the roller 134, when assembled within the bow roller assembly 102, are coaxial and, in some examples, are capable of rotating about the longitudinal axis A. The rotation facilitates the receiving of the bow of the boat in a manner that prevents damage to the boat. The first end bell 130, the second end bell 132, and the roller 134 can be composed of an elastomer, such as polyurethane or polyvinyl chloride (PVC), or other similar material having translucent properties.

As one non-limiting example, the first end bell 130, the second end bell 132, and the roller 134 are composed of a polyurethane elastomer that is non-marking to further prevent any marks or damage to the boat. The polyurethane elastomer can be aliphatic, having no aromatic rings, and is comprised of a mixture that includes at least an adduct and a curative. The adduct can be polyisocynate comprised of a plurality of isocyanate groups, —N═C═O. The curative can include hydroxyl-terminated (or amine-terminated) compounds, which react with isocyanate groups present in the mixture (e.g., to link the isocynate groups of the adduct together) to complete a polymer reaction. An example ratio of the adduct to the curative in the mixture is about 90:10.

In some examples, the mixture also includes one or more additives to alter various properties of the polyurethane elastomer. One example additive is a pigment to alter a color of the polyurethane elastomer. In some examples, the polyurethane elastomer is at least a translucent polyurethane elastomer (e.g., allows some but not all light to pass therethrough). In other examples, the polyurethane elastomer is a transparent elastomer (e.g., allows all light to pass therethrough). The pigment can be selected to promote translucency or transparency of the polyurethane elastomer. For example, a first pigment additive that provides a light blue color can be selected for inclusion in the mixture. In other examples, a second pigment additive, or in some instances no pigment additive, is included to provide a clear color. Additionally, in some examples, the pigment additive is selected based on a color of the lighting elements 138 of the bow roller assembly 102, described in greater detail below.

Another example additive that can be included within the mixture is an ultraviolet (UV) additive or stabilizer to protect the polyurethane elastomer from the degradative effects of exposure to sunlight or other UV radiation. Boat trailers, such as trailer 100, to which the bow roller assembly 102 is mounted are often exposed to sunlight for long periods of time as many boating activities take place for hours at a time on days where the sunlight is plentiful. Thus, when the boat is out on the water, the parked trailer is likely being exposed to the sunlight. This UV additive allows the roller 134 and the end bells 130, 132 to be longer lasting despite the long periods of time they are exposed to the sunlight.

Once the adduct, curative, and any additives have been incorporated into the mixture, the mixture is cast into cavities or other similar structures (e.g., molds) for the first end bell 130, the second end bell 132, and the roller 134. The mixture is then cured to form the first end bell 130, the second end bell 132, and the roller 134. An example time to cure (e.g., a gel time) is 15 minutes from the initial mixing of the adduct and curative. The yoke 136 is a frame comprised of painted or galvanized steel. The frame includes at least a first side 160 and a second side 162. In some examples and as illustrated herein, the frame is U-shaped including a base 158 from which the first side 160 and the second side 162 each extend perpendicularly from. The base 158 is mounted on or attached to the support structure 110. In some examples, the base 158 of the yoke 136 is welded onto the support structure 110. In other examples, the base 158 of the yoke 136 is otherwise fastened onto the support structure 110 to allow easy detachment and/or replacement of the yoke 136.

The first side 160 and the second side 162 of the frame each have apertures 168, 170 at end portions 164, 166 of the sides 160, 162 positioned furthest from the base 158 of the frame. For example, as shown in FIG. 3, the first side 160 includes aperture 168 at the end portion 164 of the first side 160 positioned furthest from the base 158. Although not visible in the orientations of the bow roller assembly 102 shown, the second side 162 includes a similarly positioned aperture 170 at the end portion 166 of the second side 162 furthest from the base 158. The apertures 168, 170 enable insertion of portions of the fastening assembly 140 therethrough when assembling the bow roller assembly 102. Diameters of the apertures 168, 170 are based on a type of the fastening assembly 140 used to assemble the bow roller assembly 102.

When the bow roller assembly 102 is assembled, the end portion 164 of the first side 160 of the yoke 136 is positioned between the second end portion 144 of the first end bell 130 and the first end portion 154 of the roller 134. Specifically, the aperture 168 on the end portion 164 of the first side 160 of the yoke 136 can be positioned in alignment with the aperture 150 on the second end portion 144 of the first end bell 130 and the aperture on the first end portion 154 of the roller 134. The end portion 166 of the second side 162 of the yoke 136 is positioned between the second end portion 156 of the roller 134 and the second end portion 148 of the second end bell 132. Specifically, the aperture 170 on the end portion 166 of the second side 162 of the yoke 136 can be positioned in alignment with the aperture on the second end portion 156 of the roller 134 and the aperture 152 on the second end portion 148 of the second end bell 132. These alignments enable continuous insertion of portions of the fastening assembly 140 through the various apertures to assemble the bow roller assembly 102, described in greater detail below.

An example type of the fastening assembly 140 implemented to form the bow roller assembly 102 from the above-discussed components includes a fastener 172 and a nut 174. As shown in FIG. 3, the fastener 172 can be a bolt having a first, head end 176 and a second, threaded end 178. As one example, the fastener 172 is a hex bolt and the nut 174 is a corresponding hex nut. As another example, the fastener 172 is a rod and the nut 174 is a corresponding palnut.

In some examples and as illustrated in FIG. 3, the fastener 172 is inserted in a first direction along the longitudinal axis A to form the bow roller assembly 102. For example, the threaded end 178 of the fastener 172 is inserted, via the open first end portion 146 of the second end bell 132, through the aperture 152 on the second end portion 148 of the second end bell 132. The head end 176 of the fastener 172 can have a larger diameter than the aperture 152 on the second end portion 148 of the second end bell 132 to prevent the entirety of the fastener 172 from passing through the aperture 152, which causes the head end 176 to rest against the exterior facing surface of the second end portion 148 of the second end bell 132. The fastener 172 can continue being inserted through the aperture 170 on the end portion 166 of the second side 162 of the yoke 136 into the second end portion 156 of the roller 134 through the hollow, cylindrical core of the roller 134 and out of the first end portion 154 of the roller 134. The fastener 172 can further continue being inserted through the aperture 168 on the end portion 164 of the first side 160 of the yoke 136, and through the aperture 150 on the second end portion 144 of the first end bell 130. The nut 174 is then screwed tightly onto the threaded end 178 of the fastener 172 to secure the bow roller assembly 102 formed.

In other examples, the fastener 172 is inserted in a second, opposite direction along the longitudinal axis A to form the bow roller assembly 102. For example, the threaded end 178 of the fastener 172 can be inserted, via the open first end portion 142 of the first end bell 130, through the aperture 150 on the second end portion 144 of the first end bell 130. The head end 176 of the fastener 172 can have a larger diameter than the aperture 150 on the second end portion 144 of the first end bell 130 to prevent the entirety of the fastener 172 from passing through the aperture 150, which causes the head end 176 to rest against the exterior facing surface of the second end portion 144 of the first end bell 130. The fastener 172 can continue being inserted through the aperture 168 on the end portion 164 of the first side 160 of the yoke 136 into the first end portion 154 of the roller 134 through the hollow, cylindrical core of the roller 134 and out of the second end portion 156 of the roller 134. The fastener 172 can further continue being inserted through the aperture 170 on the end portion 166 of the second side 162 of the yoke 136, and through the aperture 152 on the second end portion 148 of the second end bell 132. The nut 174 is then screwed tightly onto the threaded end 178 of the fastener 172 to secure the assembled bow roller assembly 102.

The fastening assembly described and illustrated herein is a non-limiting example. Other types of fastening assemblies can be implemented. However, as previously discussed, in some examples, the first end bell 130, the second end bell 132, and the roller 134 rotate about the longitudinal axis A to facilitate receipt of the bow of the boat. Therefore, when these components are rotatable, the type of fastening assembly 140 selected should enable the first end bell 130, the second end bell 132, and the roller 134 to rotate when the bow roller assembly 102 is assembled.

The bow roller assembly 102 also includes one or more lighting elements 138 arranged therein to illuminate bow roller assembly 102. The lighting elements 138 can include light emitting diodes (LEDs) or other similar lighting elements that are water resistant. In some examples, the lighting elements 138 are configured as rings (e.g., LED rings), as shown clearly in FIG. 3. The lighting elements 138 can be a single color or multi-colored. As previously discussed, pigment additives included in the mixture from which the first end bell 130, second end bell 132, and roller 134 are formed can be selected based on the color of the lighting elements 138. In one example, when the lighting elements 138 are a single, white color, a first pigment additive is selected causing the end bells 130, 132 and roller 134 to be light blue in color. In another example, when the lighting elements 138 are multi-colored (e.g., red, green, and blue lighting elements), a second pigment additive is selected to cause the end bells 130, 132 and roller 134 to be clear in color. In some instances, the clear color is achieved by including no pigment additive.

Any number of lighting elements 138 can be used, and the lighting elements 138 can be arranged in a plurality of configurations. For example, the lighting elements 138 can be mounted on or recessed into one or more of the yoke 136, the end bells 130, 132, and/or the roller 134. Generally, the lighting elements 138 are arranged such that light from the lighting elements 138 is emitted toward one or more of the end bells 130, 132 and the roller 134. Properties of the polyurethane elastomer, from which the end bells 130, 132 and the roller 134 are composed of facilitate propagation of the light received from the lighting elements 138 via refraction, which extends illumination to areas surrounding the bow roller assembly 102 in addition to the bow roller assembly 102 itself. For example, the first end bell 130, the second end bell 132, and the roller 134 are at least translucent, and thus refract at least a portion of the light received from the lighting elements 138. Additionally, in some examples, the shape of the end bells 130, 132 and the roller 134 can further facilitate the propagation of the light. For example, the hollow truncated cone of each of the first end bell 130 and the second end bell 132, as well as the two portions of the v-shaped roller 134 can be frustums having identical edges, and thus are uniform prisms that refract the light received from the lighting elements 138.

In the examples shown in FIGS. 2-8, the bow roller assembly has four lighting elements: first lighting element 138A, second lighting element 138B, third lighting element 138C, and fourth lighting element 138D. However, as previously discussed, any number of lighting elements 138 can be included in the bow roller assembly 102.

In one example configuration, and as clearly shown in FIGS. 5-6 described below, the lighting elements 138 are recessed into the yoke 136. The first lighting element 138A can be recessed into an exterior facing surface at the end portion 164 of the first side 160 of the yoke 136 to emit light towards the first end bell 130. The second lighting element 138B can be recessed into an interior facing surface at the end portion 164 of the first side 160 of the yoke 136 to emit light towards the first end portion 154 of the roller 134. The third lighting element 138C can be recessed into an interior facing surface at the end portion 166 of the second side 162 of the yoke 136 to emit light towards the second end portion 156 of the roller 134. The fourth lighting element 138D can be recessed into an exterior facing surface at the end portion 166 of the second side 162 of the yoke 136 to emit light towards the second end bell 132. When the lighting elements 138 are ring-shaped as shown, the recessed first lighting element 138A and the recessed second lighting element 138B can surround the aperture 168 at the end portion 164 of the first side 160 of the yoke 136. Similarly, the recessed third lighting element 138C, and the recessed fourth lighting element 138D can surround the aperture 170 at the end portion 166 of the second side 162 of the yoke 136.

In another example configuration, and as clearly shown in FIGS. 7-8 described below, the lighting elements 138 can be recessed into one or more of the first end bell 130, the second end bell 132, and the roller 134. As a non-limiting example, the first lighting element 138A can be recessed into the second end portion 144 of the first end bell 130, the second lighting element 138B can be recessed into the first end portion 154 of the roller 134, the third lighting element 138C can be recessed into the second end portion 156 of the roller 134, and the fourth lighting element 138D can be recessed into the second end portion 148 of the second end bell 132. Other combinations of the above can be implemented. For example, two lighting elements, the second lighting element 138B and the third lighting element 138C, can be included within the bow roller assembly 102 that are recessed into the first end portion 154 of the roller 134 and the second end portion 156 of the roller 134, respectively.

Each of the configurations described above include the lighting elements 138 being recessed into the various components of the bow roller assembly 102. In some embodiments, recession includes implementation of an insert molding process (e.g., when the lighting elements 138 are recessed in the roller 134 and/or end bells 130, 132 as discussed in greater detail below with reference to FIGS. 7-8). Recession of the lighting elements 138 can prevent interference with the normal configuration or operation of the components of the bow roller assembly 102. However, the lighting elements 138 are not limited to being recessed into the various components of the bow roller assembly 102. In other examples, the lighting elements can be otherwise mounted or attached to the yoke 136, the end bells 130, 132, and/or the roller 134.

Each of the lighting elements 138 have one or more lighting element wires connected thereto that carry current from a power source to the lighting elements 138. At least a portion of the lighting element wires, particularly the lighting element wires exposed to the external environment, are enclosed in a conduit or otherwise protected. In some examples, the yoke 136 can be configured to receive the lighting element wires, acting similar to a conduit to protect the lighting element wires from the external environment. For example, a portion of the yoke 136 can include a hollow interior compartment in which the lighting element wires are received and enclosed.

When the lighting elements 138 are recessed into the yoke 136 and the portion of the lighting element wires for each of the lighting elements 138 are enclosed in a conduit, the conduit can be attached to the yoke 136 to prevent the conduits from becoming tangled or otherwise entwined with other objects, including other components of the bow roller assembly 102, such as the roller 134 and end bells 130, 132 when capable of rotating, or other external components. The conduits enclosing the lighting element wires can extend into the hollow interior of the support structure 110, where the conduit ends as the lighting element wires are received in the bow tubing within the hollow interior of the support structure 110. The lighting element wires can then exit the bow tubing and join into the wiring harness 118, as described in greater detail with reference to FIG. 1. Alternatively, if the yoke 136 is configured to receive the lighting element wires, the lighting element wires can be provided from the yoke 136 (e.g., from the hollow interior compartment) into the bow tubing within the hollow interior of the support structure 110, where the lighting element wires can then exit the bow tubing and join into the wiring harness 118, as described in greater detail with reference to FIG. 1.

The wiring harness 118 is then connected to the electrical system of the tow vehicle 116 (e.g., the power source). The example switch 120 described with reference to FIG. 1 can be included as part of the circuit between the electrical system of the tow vehicle 116 and the lighting elements 138. Resultantly, when the running lights of the tow vehicle 116 are on (e.g., are powered by the battery of the electrical system), the trailer 100 is backed into water, and the water contacts the switch 120, the switch 120 completes the circuit allowing current from the electrical system to the lighting elements 138 via the lighting element wires. Once current is received, the lighting elements 138 emit light, causing illumination of the bow roller assembly 102.

As illustrated and described in greater detail with reference to FIGS. 7-8, when the lighting elements 138 are recessed into the roller 134 and/or the end bells 130, 132, an alternate power source and wiring scheme can be utilized. For example, the one or more lighting element wires connected to each of the lighting elements 138 can be connected to a battery power source, for example, that is recessed in the roller and/or the end bells 130, 132 along with the lighting elements 138. In some examples, the battery may be a solar-powered battery. In other examples, a receiver can form a circuit with the battery and respective lighting element 138 to form a circuit, where the receiver acts as a switch and is communicatively coupled (e.g., wirelessly) to a transceiver external to the bow roller assembly 102.

Figure 4:
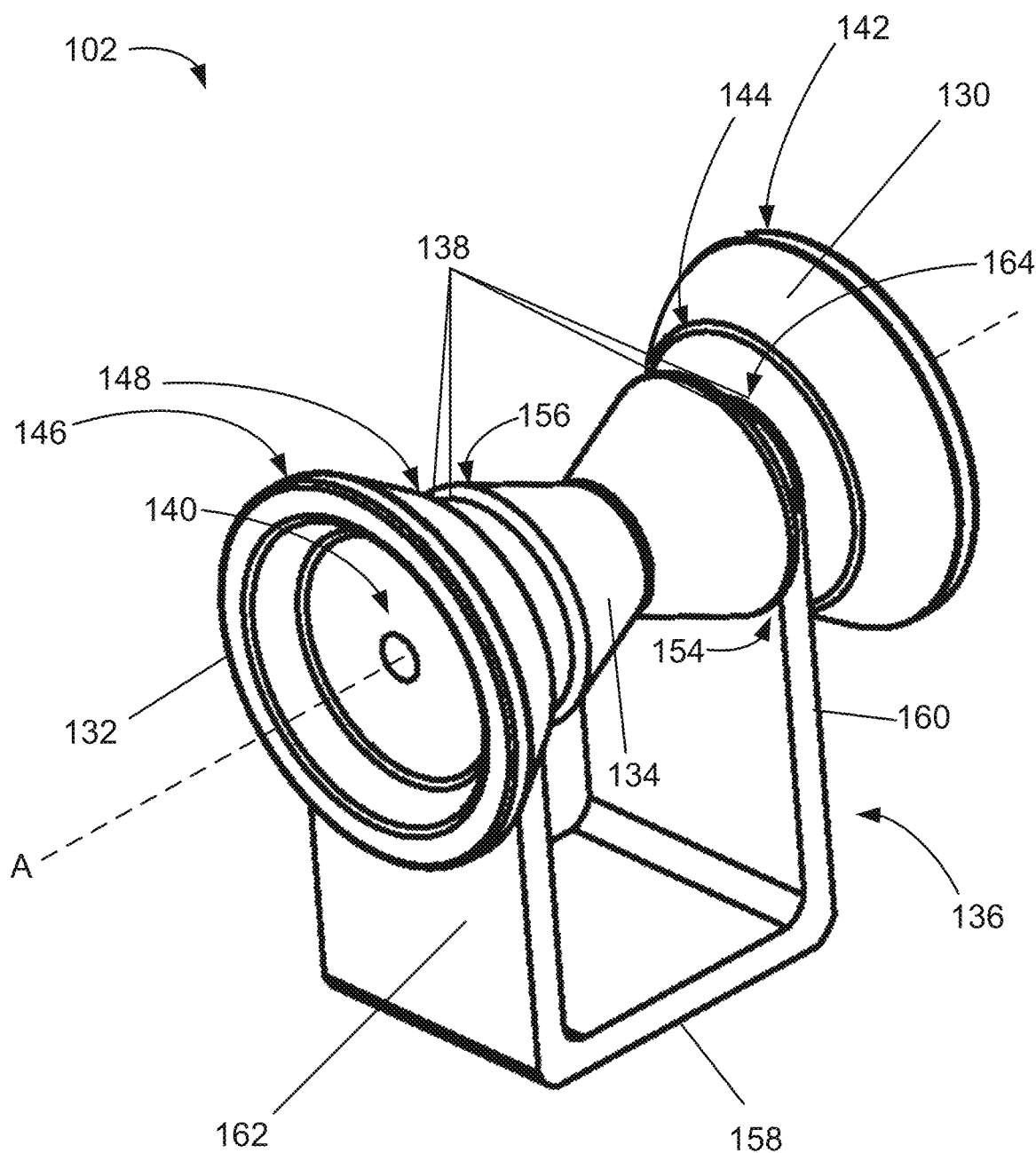
FIG. 4 illustrates a back, right side perspective view of the example bow roller assembly of FIG. 2.

FIG. 4 illustrates a back, right side perspective view of the bow roller assembly 102 of FIG. 2. FIG. 5 illustrates a front view of the bow roller assembly 102 of FIG. 2. FIG. 6 illustrates a top view of the bow roller assembly 102 of FIG. 2.

Figure 5:
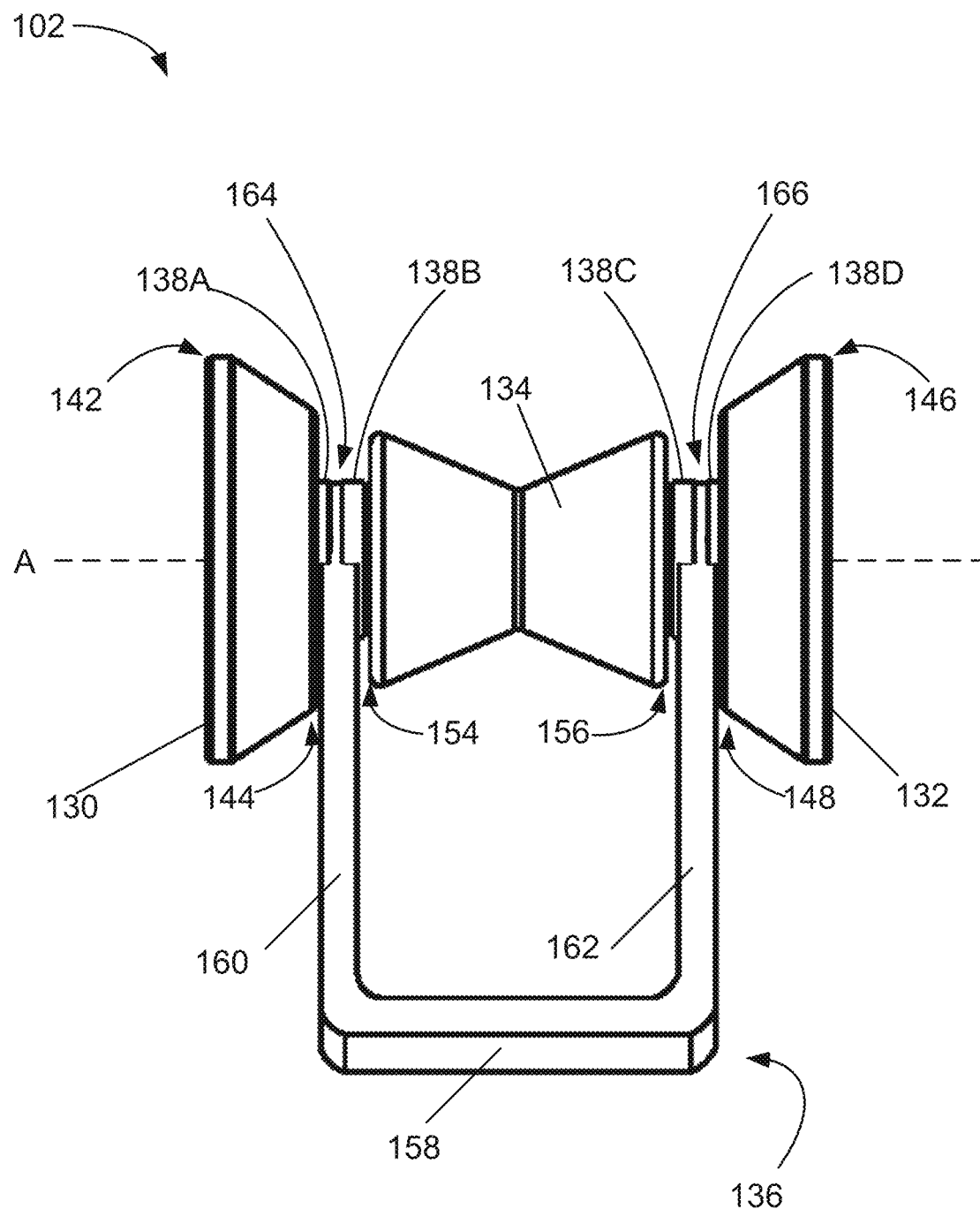
FIG. 5 illustrates a front view of the example bow roller assembly of FIG. 2.
Figure 6:
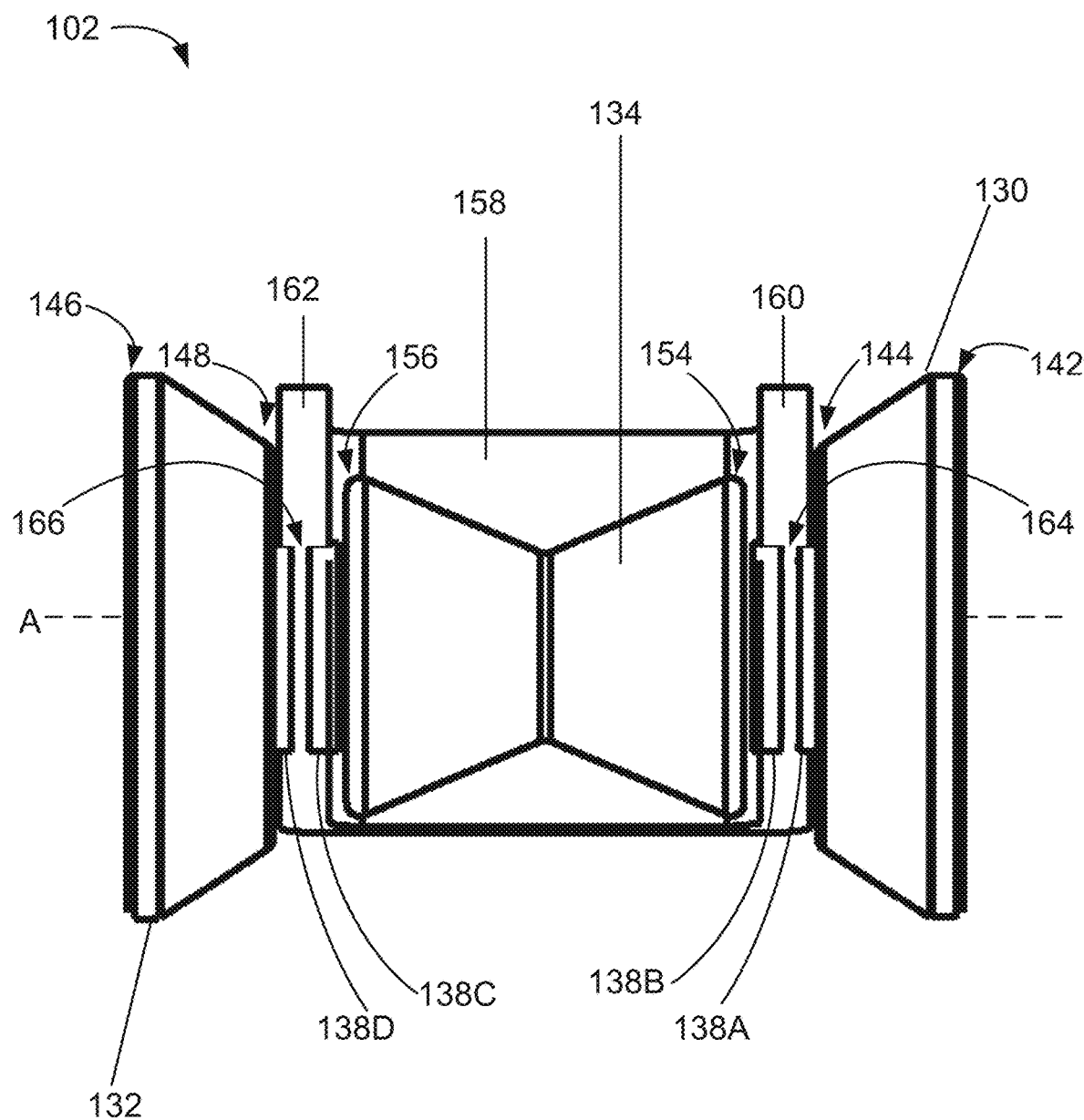
FIG. 6 illustrates a top view of the example bow roller assembly of FIG. 2.

FIGS. 5 and 6 clearly depict the example configuration described above where the lighting elements 138 are recessed into the yoke 136. For example, as shown, the first lighting element 138A is recessed into an exterior facing surface at the end portion 164 of the first side 160 of the yoke 136 to emit light towards the first end bell 130. The second lighting element 138B is recessed into an interior facing surface at the end portion 164 of the first side 160 of the yoke 136 to emit light towards the first end portion 154 of the roller 134. The third lighting element 138C is recessed into an interior facing surface at the end portion 166 of the second side 162 of the yoke 136 to emit light towards the second end portion 156 of the roller 134. The fourth lighting element 138D is recessed into an exterior facing surface at the end portion 166 of the second side 162 of the yoke 136 to emit light towards the second end bell 132.

By emitting light towards the end bells 130, 132 and each end portion 154, 156 of the roller 134, the translucent properties of the polyurethane elastomer from which the end bells 130, 132 and roller 134 are composed and, in some examples, the shape thereof enable propagation of the light emitted from the lighting elements 138 via refraction, similar to a prism. This propagation of light causes illumination of areas surrounding the bow roller assembly 102 in addition to the bow roller assembly 102 itself.

Figure 7:
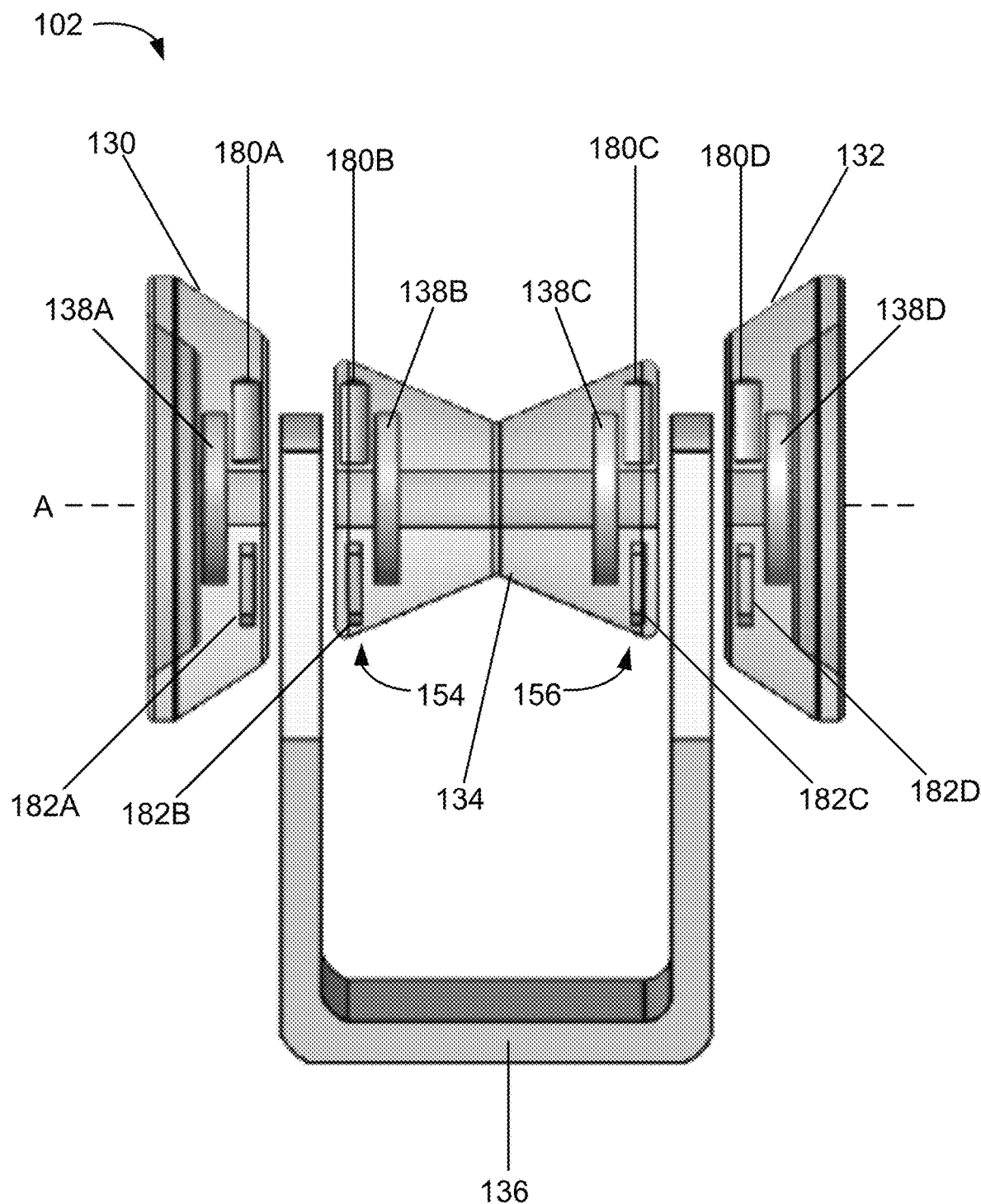
FIG. 7 illustrates a front view of another example configuration of the bow roller assembly of FIG. 2 according to the principles of the present disclosure.
Figure 8:
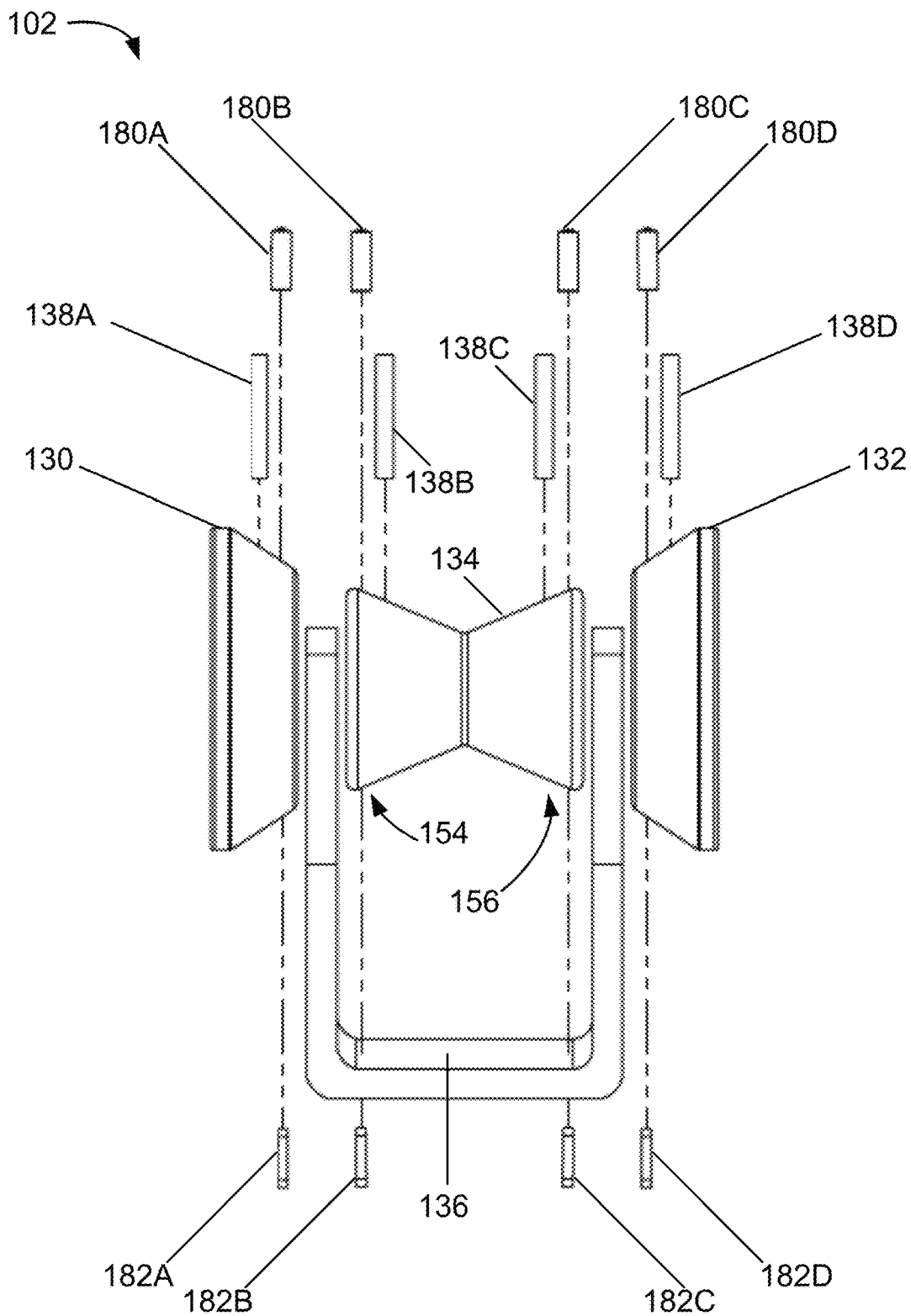
FIG. 8 illustrates an exploded view of the example bow roller assembly of FIG. 7.

FIGS. 7 and 8 illustrate another example configuration of the bow roller assembly 102 where the lighting elements 138 are recessed in the roller 134 and the end bells 130, 132. FIG. 7 illustrates a front view of the other example configuration of the bow roller assembly 102. FIG. 8 illustrates an exploded view of the example bow roller assembly 102 of FIG. 7. In addition to the first end bell 130, second end bell 132, roller 134, yoke 136, lighting elements 138, and fastening assembly 140, the bow roller assembly 102 can also include one or more batteries 180A, 180B, 180C, 180D (e.g., collectively referred to as batteries 180) to supply power to the lighting elements 138 and one or more switches 182A, 182B, 182C, 182D (e.g., collectively referred to as switches 182) or other type of device to control the batteries 180.

In one example embodiment, and as illustrated, the first lighting element 138A is recessed into the first end bell 130, the second lighting element 138B is recessed into the first end portion 154 of the roller 134, the third lighting element 138C is recessed into the second end portion of the roller 156, and the fourth lighting element 138D is recessed into the second end bell 132.

The batteries 180 and switches 182 can also be recessed within the roller 134 and the end bells 130, 132. In one example embodiment, and as illustrated, a first battery 180A and a first switch 182A is recessed into the first end bell 130, a second battery 180B and a second switch 182B is recessed into the first end portion 154 of the roller 134, a third battery 180C and a third switch 182C is recessed into the second end portion of the roller 156, and a fourth battery 180D and a fourth switch 182D is recessed into the second end bell 132.

The switches 182 are connected to the respective batteries 180 and the lighting elements to form a circuit, where the switches 182 control the switching on and off of the circuit. As one example implementation, each switch 182 may be in the form of a reed type switch which may be activated with one or more magnets or magnetic fields. For this example implementation, magnets or magnetic field generators may be located in proximity to the reed-type switches and, wirelessly or via a wired circuit, actuated to control the on/off state of each reed-type switch.

As another example implementation, the switches 182 may be configured as wireless receivers that are communicatively coupled (e.g., wirelessly) to one or more transmitters that are external from the bow roller assembly 102. In various aspects, the transmitters and switches 182 can communicate using a variety of wireless technologies, including Wi-Fi, and/or Bluetooth technologies. In one embodiment, the transmitters can be one or more components associated with a boat or other watercraft that is being loaded (e.g., an external component mounted to the boat or internal component of the boat's electrical system that a user can activate). In another example, the transmitters can be components of a mobile device (e.g., accessible via an application) that a user of the mobile device can activate.

Upon activation of one or more of the transmitters, the transmitters send signals (e.g., radio waves) to the switches 182 or magnet field actuator(s) for example. The switches 182 can then convert the radio waves to an electrical signal that causes completion of the circuit or applies a magnet field to cause completion of the circuit. Completion of the circuit causes the batteries 180 to supply current to the lighting element wires, which carry the current from the batteries 180 to the lighting elements 138. Receipt of the current causes the lighting elements to emit light and resultantly illuminate the bow roller assembly 102 and surrounding area.

Recessing of the lighting elements 138, the batteries 180, and/or the switches 182 within the roller 134 and/or the end bells 130, 132 may also include implementation of an insert molding process. For example, as previous discussed, once the material components of the elastomer (e.g., an adduct, curative, and any additives) have been incorporated into a mixture, the mixture is cast into cavities or other similar structures (e.g., molds) for the first end bell 130, the second end bell 132, and the roller 134. The lighting elements 138, the batteries 180, and/or the switches 182 may be placed within the molds prior to the mixture is cast therein or shortly after the mixture is cast. The mixture comprising the placed lighting elements 138, the batteries 180, and the switches 182 can then be cured to form the first end bell 130, the second end bell 132, and the roller 134.

The bow roller assembly 102, as illustrated and described with reference to FIGS. 2-8, is one example type of bow assembly. Other example types of bow assemblies, such as a bow slide, a bow ramp, or other similar type of positive stop, may be similarly configured to illuminate the general area of the bow stop 101. These other types of bow assemblies may perform a similar function to receive a bow of a boat for loading onto a trailer.

Figure 9:
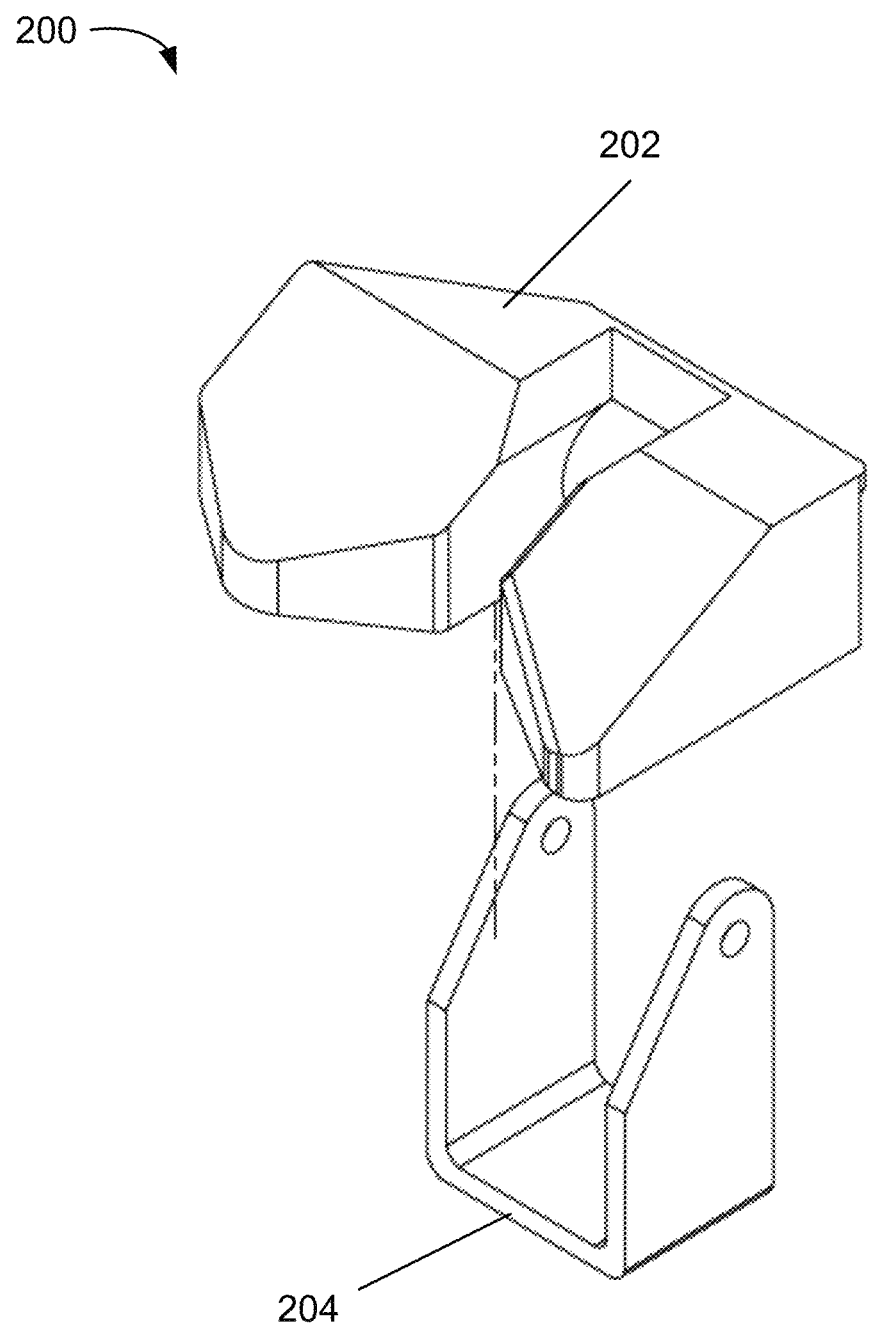
FIG. 9 illustrates a front, right side perspective view of another example bow stop according to the principles of the present disclosure.
Figure 10:
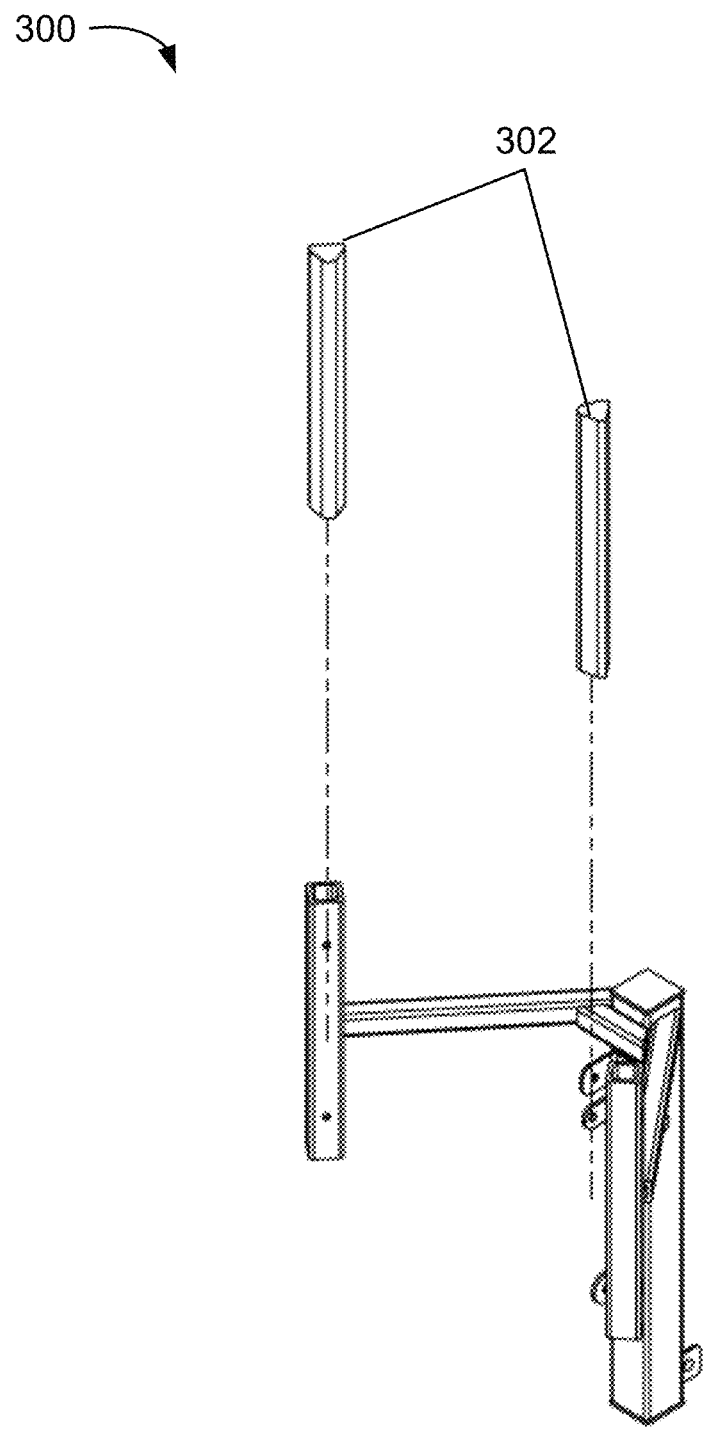
FIG. 10 illustrates a front, right side perspective view of a further example bow stop according to the principles of the present disclosure.
Figure 11:
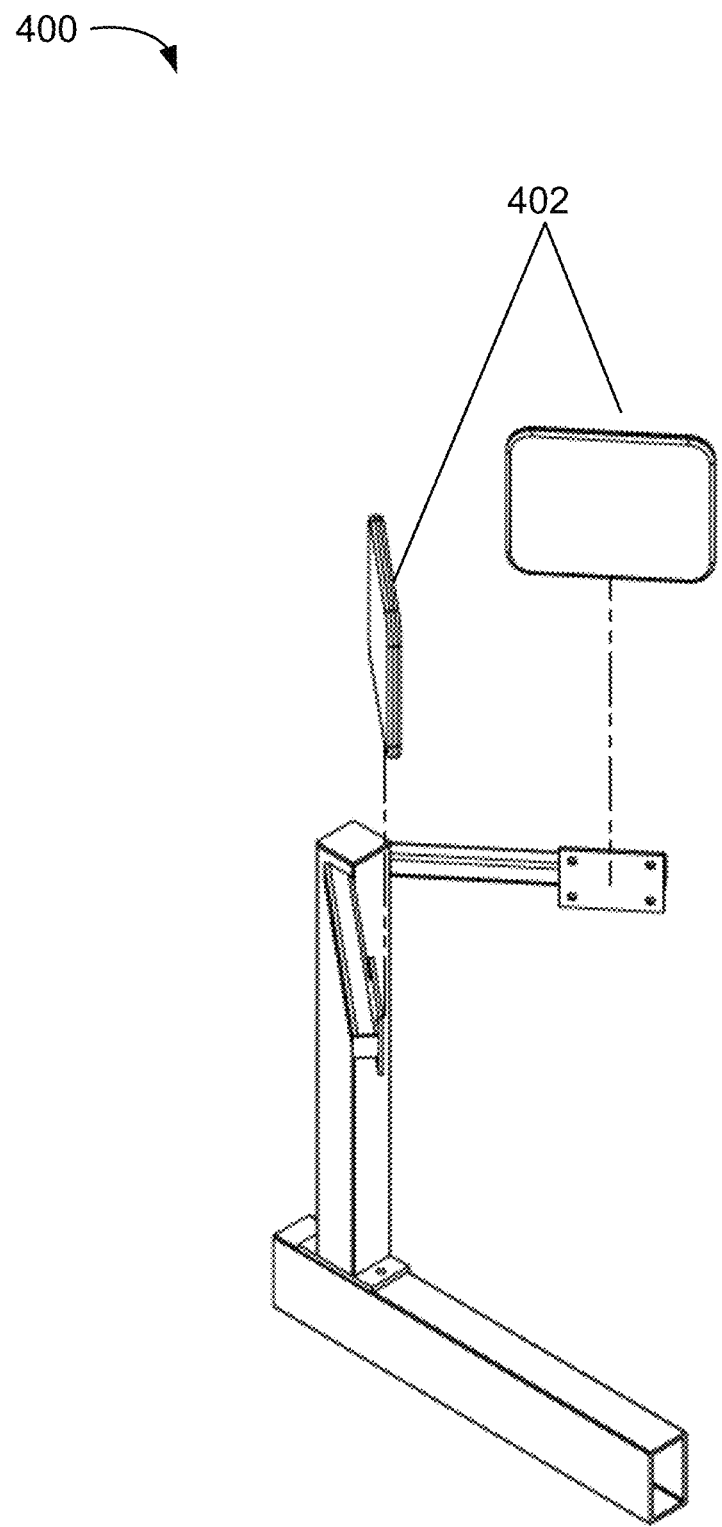
FIG. 11 illustrates a front, left side perspective view of a yet further example bow stop according to the principles of the present disclosure.

Additionally, FIGS. 1-8 illustrate and describe one example type of bow stop (e.g., bow stop 101) having the bow roller assembly 102 mounted thereto. FIGS. 9 through 11 describe other example bow stops. These other bow stops can include components having similar translucent elastomer compositions as the roller 134 and end bells 130, 132 discussed with reference to FIGS. 1-8. Additionally, one or more of these components can have one or more lighting elements similar to lighting elements 138 that are attached to or recessed therein to illuminate the bow stop, where the lighting elements can include LED rings or LED strips, among other examples. Further, some of these example bow stops can also include the bow roller assembly 102 and/or the winch assembly 112.

FIG. 9 illustrates a front, right side perspective view of another example bow stop 200 according to the principles of the present disclosure. The bow stop 200 includes a component 202 that receives a bow of the boat and attaches to a yoke 204 (similar to yoke 136) of the bow stop 200, where the component 202 can be comprised of the translucent material and include the lighting elements.

FIG. 10 illustrates a front, right side perspective view of a further example bow stop 300 according to the principles of the present disclosure. Pads 302 of the bow stop 300 can be comprised of the translucent material and include the lighting elements. Additionally, the bow stop 300 can further include the winch assembly 112.

FIG. 11 illustrates a front, left side perspective view of a yet further example bow stop 400 according to the principles of the present disclosure. Pads 402 of the bow stop 400 can be comprised of the translucent material and include the lighting elements. Additionally, the bow stop 400 can further include the bow roller assembly 102 and the winch assembly 112 positioned below the pads 402, for example.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A bow roller assembly comprising:
   bow roller components comprising:
      a first end bell;
      a second end bell;
      a roller comprising a first end portion and a second end portion; and
      a yoke comprising a frame having at least a first side and a second side, wherein when the bow roller components are connected together, the first side is arranged between the first end bell and the first end portion of the roller, and the second side is arranged between the second end portion of the roller and the second end bell;

a fastening assembly configured to connect the bow roller components together; and one or more lighting elements included with or adjacent to at least one of the roller, the first end bell, and the second end bell to illuminate at least one of the roller, the first end bell, and the second end bell.

2. The bow roller assembly of claim 1, wherein the one or more lighting elements are light emitting diodes (LEDs).

3. The bow roller assembly of claim 2, wherein the one or more lighting elements are LED rings.

4. The bow roller assembly of claim 1, wherein the one or more lighting elements are single color lighting elements or multicolor lighting elements.

5. The bow roller assembly of claim 1, wherein at least one of the first end bell, the second end bell, and the roller are comprised of a translucent material such that at least one of the first end bell, the second end bell, and the roller that receive the light from the one or more lighting elements propagate the light through the translucent material.

6. The bow roller assembly of claim 1, wherein the first end bell, the second end bell, and the roller are comprised of a polyurethane elastomer.

7. The bow roller assembly of claim 6, wherein the polyurethane elastomer includes one or more of a pigment additive and an ultraviolet (UV) additive.

8. The bow roller assembly of claim 7, wherein the polyurethane elastomer includes a first pigment additive if the one or more lighting elements are single-color lighting elements, a second pigment additive if the one or more lighting elements are multicolor lighting elements, and the second pigment additive can be no pigment additive.

9. The bow roller assembly of claim 1, wherein the one or more lighting elements are recessed into the first side and the second side of the frame of the yoke, and one or more of:
   a first lighting element of the one or more lighting elements is recessed into an exterior facing surface on the first side of the frame to emit the light towards the first end bell;
   a second lighting element of the one or more lighting elements is recessed into an interior facing surface on the first side of the frame to emit the light towards the first end portion of the roller;
   a third lighting element of the one or more lighting elements is recessed into an interior facing surface on the second side of the frame to emit the light towards the second end portion of the roller; and
   a fourth lighting element of the one or more lighting elements is recessed into an exterior facing surface on the second side of the frame to emit the light towards the second end bell.

10. The bow roller assembly of claim 1, further comprising:
   for each of the one or more lighting elements, one or more wires connected to the respective lighting element that enables the lighting element to be coupled to a power source to form a circuit, wherein the circuit further includes a switch that, when actuated, completes the circuit to enable the one or more lighting elements to receive current from the power source via the one or more wires and emit the light.

11. The bow roller assembly of claim 10, wherein the switch is an external contact switch that is actuated upon contact with water.

12. A device for illuminating one or more components of a bow roller assembly comprising:
   a yoke of the bow roller assembly; and
   one or more lighting elements included with or adjacent to the yoke to illuminate the one or more components of the bow roller assembly, wherein the one or more components of the bow roller assembly include a first end bell comprised of a translucent material, a roller comprised of a translucent material, and a second end bell comprised of a translucent material,
   wherein the yoke is connected with the first end bell, the roller, and the second end bell by a fastening assembly to form the bow roller assembly, and the one or more lighting elements are configured to emit light to illuminate at least one of the first end bell, the roller, and the second end bell, wherein the light is propagated through the translucent material of at least one of the first end bell, the roller, and the second end bell.

13. The device of claim 12, wherein the yoke comprises a frame including at least a first side and a second side, and each of the first side and the second side includes an aperture.

14. The device of claim 13, wherein one or more of:
   a first lighting element of the one or more lighting elements is recessed into an exterior facing surface on the first side of the frame to emit the light towards the first end bell;
   a second lighting element of the one or more lighting elements is recessed into an interior facing surface on the first side of the frame to emit the light towards a first end portion of the roller;
   a third lighting element of the one or more lighting elements is recessed into an interior facing surface on the second side of the frame to emit the light towards a second end portion of the roller; and
   a fourth lighting element of the one or more lighting elements is recessed into an exterior facing surface on the second side of the frame to emit the light towards the second end bell.

15. The device of claim 14, wherein the one or more lighting elements are ring-shaped, and one or more of the recessed first lighting element, the recessed second lighting element, the recessed third lighting element, and the recessed fourth lighting element surround the aperture on the first side or the second side of the frame, respectively.

16. The device of claim 12, further comprising, for each of the one or more lighting elements, one or more wires connected to the respective lighting element that enables the lighting element to be coupled to a power source to form a circuit.

17. The device of claim 16, further comprising a conduit to enclose at least a portion of the one or more wires connected to the respective lighting element, the conduit attached to the yoke.

18. The device of claim 16, wherein the yoke includes an interior compartment to receive and enclose at least a portion of the one or more wires connected to the respective lighting element.

19. A device for illuminating one or more components of a bow roller assembly comprising:
   a roller of the bow roller assembly, the roller comprised of a translucent material; and
   one or more lighting elements included with or adjacent to the roller to illuminate the roller, wherein the light is propagated through the translucent material, and wherein the roller is connected with a first end bell, a yoke, and a second end bell by a fastening assembly to form the bow roller assembly.

20. A device for illuminating one or more components of a bow roller assembly comprising:
    an end bell of the bow roller assembly, the end bell comprised of a translucent material; and
    a lighting element included with or adjacent to the end bell to illuminate the end bell, wherein the light is propagated through the translucent material, and
    wherein the end bell is connected with a yoke, a roller, and another end bell by a fastening assembly to form the bow roller assembly.

* * * * *